Patented Aug. 16, 1932

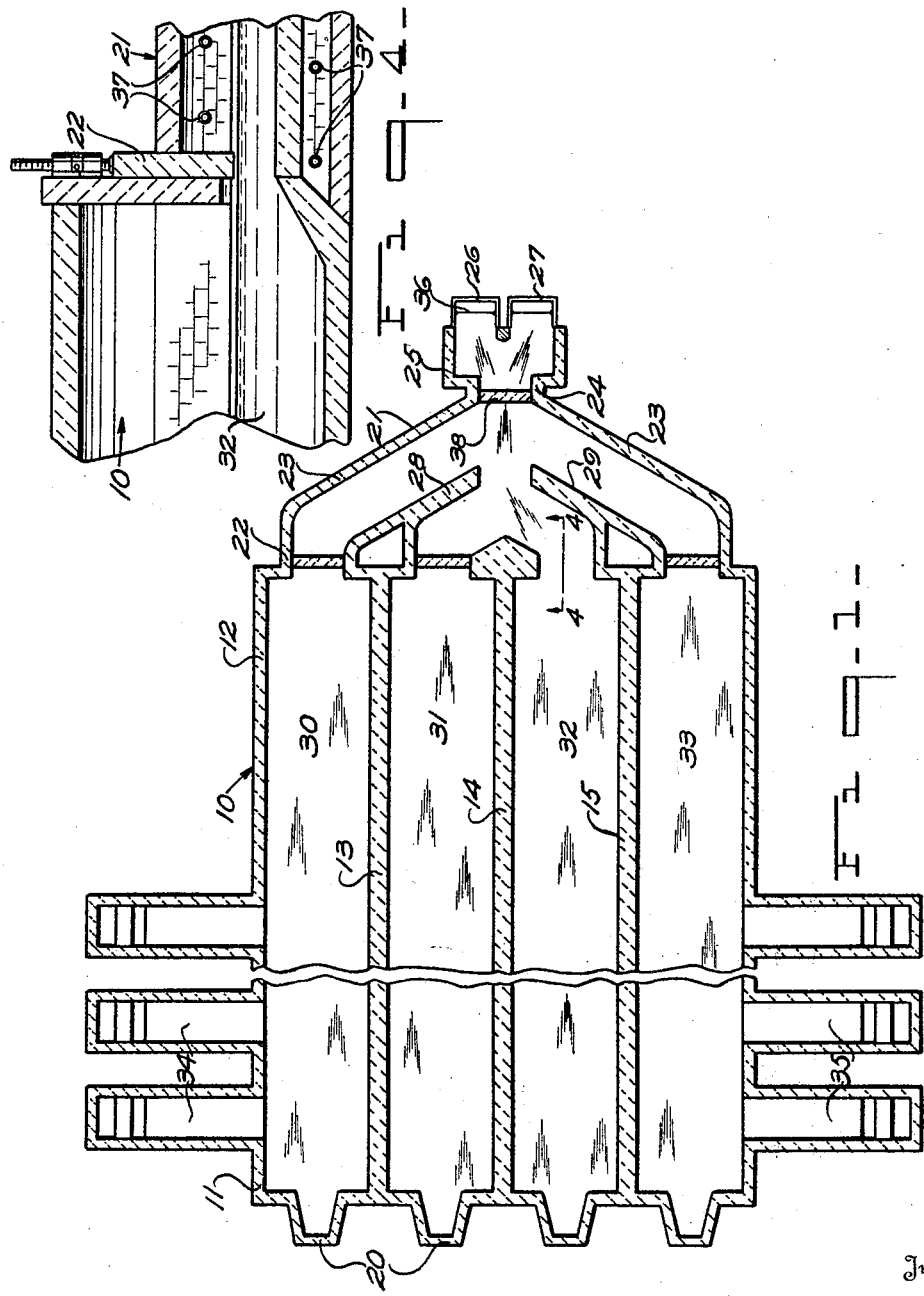

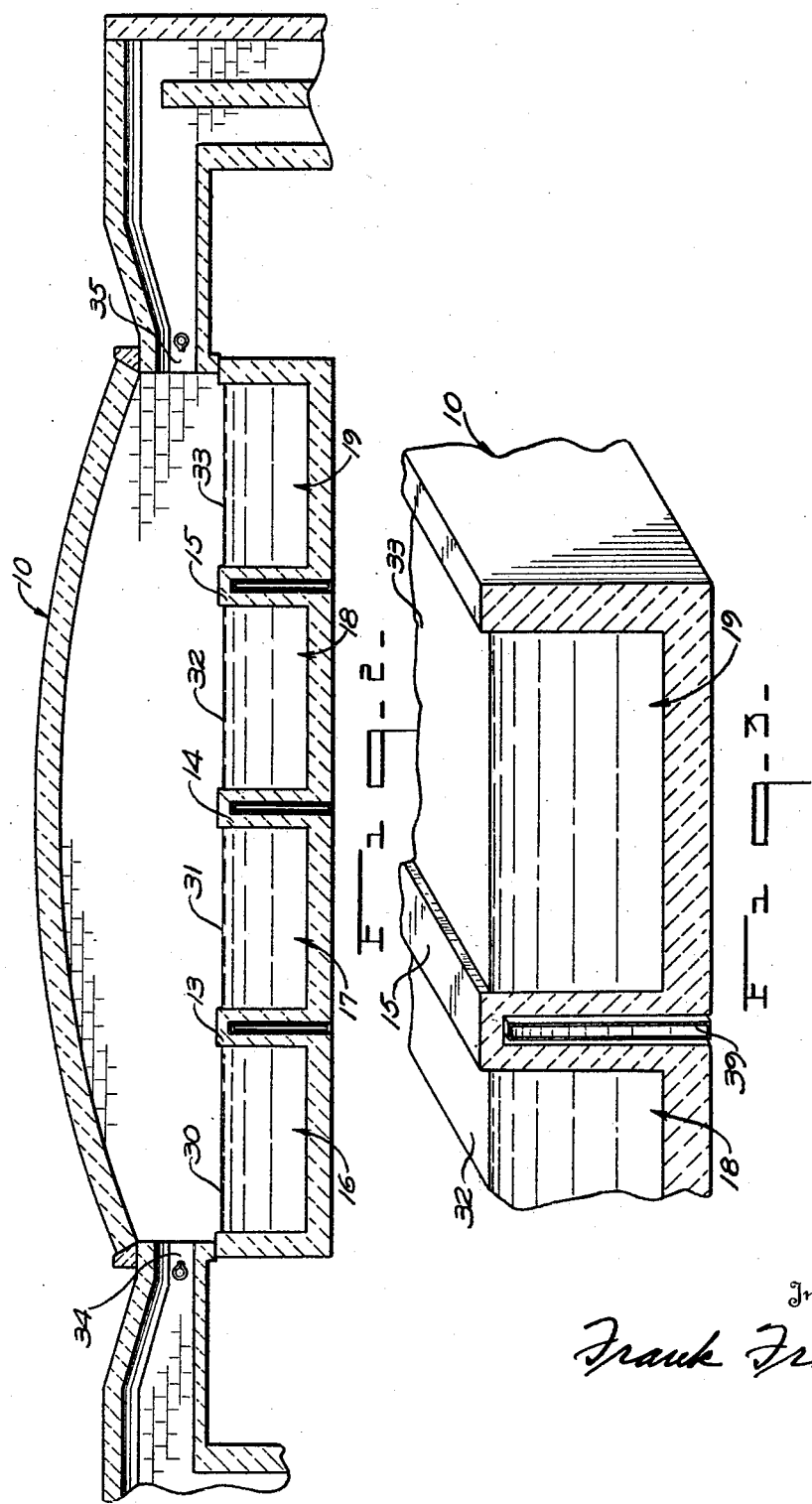

1,872,437

UNITED STATES PATENT OFFICE

FRANK FRASER, OF TOLEDO, OHIO, ASSIGNOR TO LIBBEY-OWENS-FORD GLASS COMPANY, OF TOLEDO, OHIO, A CORPORATION OF OHIO

CONTINUOUS TANK FURNACE

Application filed June 13, 1927. Serial No. 198,504.

This invention relates to new and useful improvements in continuous tank furnaces and particularly to furnaces of this type adapted primarily for supplying molten glass to sheet forming machines, although the improvements are also applicable to furnaces for supplying molten glass to machines for producing glass bottles or other glass articles.

In the usual continuous tank furnace, the raw glass making materials known as batch are periodically fed into the melting end of the tank where an intense heat is maintained to fuse the materials to form the molten glass. This molten glass then flows through a refining chamber and thence through a cooling chamber to a working receptacle, the glass being adapted to settle down and acquire a proper working consistency and homogeneity during its passage through these chambers.

In this type of furnace, the molten glass is in a continuous state of movement with the result that the time required or allowed for the melting and refining of the glass is relatively short and it is believed insufficient for the proper conditioning, this being largely due to the fact that the surface glass, from which the sheet is ordinarily produced, flows quite rapidly through the furnace while the lower glass remains practically stationary. Sheet glass produced from improperly refined glass also contains a considerable number of seeds, blisters and other well known defects.

An important object of the present invention is to provide a continuous tank furnace of improved construction wherein the molten glass will be permitted to remain a longer period than heretofore, to the end that the molten glass when finally introduced into the article being formed will be properly refined and relatively free from those common glass defects such as seeds, blisters, etc.

Another object of the invention is to provide a continuous tank furnace containing a plurality of individual pools of molten glass, and further embodying means whereby the glass from any one of the pools can be flowed into a common working receptacle without disturbing the glass in the other pools, the molten glass within the working receptacle being adapted to be either drawn therefrom in sheet form or formed into other glass articles as desired.

Another object of the invention is to provide a continuous tank furnace containing a plurality of individual pools of molten glass and a heating means common to all of said pools for conditioning the glass therein, means being also provided whereby the raw glass making materials may be separately fed into the individual pools to compensate for the removal of molten glass therefrom.

Still another object is to provide a continuous tank furnace divided into a plurality of individual compartments which communicate with a common working receptacle or receptacles, the raw glass making materials being introduced into the several compartments in such a manner that one of the said compartments will always contain a supply of completely refined and settled molten glass which can be fed to the working receptacle or receptacles to the end that a continuous flow of intermittently prepared molten glass to the said working receptacle or receptacles may be achieved.

Other objects and advantages of the invention will become more apparent during the course of the following description when taken in connection with the accompanying drawings.

In the drawings wherein like numerals are employed to designate like parts throughout the same, Fig. 1 is a horizontal longitudinal section through a continuous tank furnace constructed in accordance with the present invention, Fig. 2 is a transverse section therethrough, Fig. 3 is a detail perspective view of a portion of the furnace, and Fig. 4 is a section taken substantially on line 4—4 of Fig. 1.

Referring now to the drawings, the present invention embodies a preferably substantially rectangular tank designated in its entirety by the numeral 10 and comprising a melting end 11, wherein the raw glass making materials are adapted to be fused, and a refining end 12 wherein the resultant molten glass is adapted to be refined.

Arranged within the tank 10 are a plurality of longitudinally extending spaced parallel partition walls 13, 14 and 15 which serve to divide the interior thereof into a plurality of longitudinally extending individual compartments 16, 17, 18 and 19. Each of these compartments is provided at one end thereof with a dog-house 20 through which the raw glass making materials may be fed thereto while the opposite end of each compartment communicates with a common connecting chamber 21, the flow of molten glass from each compartment to the said chamber being independently controlled by a vertical adjustable gate or shear cake 22.

The side walls 23 of connecting chamber 21 converge forwardly as shown with their outer ends spaced to provide a neck 24 positioned substantially intermediate the sides of the tank 10. Associated with this neck 24 and communicating with the chamber 21 is a cooling chamber 25 with which is associated a pair of working receptacles 26 and 27. Arranged within the connecting chamber 21 are a pair of forwardly converging guide walls 28 and 29 which serve to direct the molten glass from the several compartments into the cooling chamber.

The raw glass making materials or batch introduced into the several compartments, is adapted to be melted therein to form a plurality of individual pools of molten glass 30, 31, 32 and 33. This melting is preferably accomplished by means of regenerators located at opposite sides of the furnace, the flames being adapted to enter the furnace alternately from one side thereof and then the other through oppositely disposed ports 34 and 35. The flames entering the furnace from one side thereof will be exhausted through the ports at the opposite side as will be readily understood. Thus, the same heating means is used for conditioning the glass contained within all of the compartments, or, in other words, the heating means is common to the several pools of molten glass.

In the operation of the invention, the glass batch ingredients are adapted to be introduced into the several compartments 16, 17, 18 and 19 through the dog-houses 20 and subsequently melted within the said compartments to form a plurality of individual pools of molten glass 30, 31, 32 and 33, the glass being prevented from flowing from these pools by means of the gates or shear cakes 22 which have been previously lowered. The molten glass is then caused to remain within these compartments for a considerable length of time in order to give the same a sufficient opportunity to completely refine and settle, after which the desired gate or gates 22 are raised to permit the refined molten glass to flow into and through the connecting chamber 21 and cooling chamber 25 to the working receptacles 26 and 27 from which it may be either drawn away in sheet form as indicated at 36 or formed into other glass articles as desired. The temperature of the molten glass flowing through the connecting chamber 21 to the cooling chamber 25 may be controlled by means of burners 37 located above or beneath the same, and a bridge wall 38 may be partially submerged in the molten glass at the neck 24 to prevent the incoming glass from unduly disturbing the glass in the cooling chamber and working receptacles.

The glass batch ingredients are adapted to be introduced into the series of compartments in such a manner that the molten glass within the said compartments will be in progressively different stages of melting and refining so that one of the compartments will always contain a supply of completely refined and settled molten glass which can be flowed into the working receptacles. It is not desirable that one compartment be completely emptied before another is started but only that that portion of the molten glass which has been in the tank for a sufficient length of time to completely refine and settle be drawn off. For example, preferably only that portion of the glass within the outer end of the refining end 12 of tank 10 being removed. As the completely refined molten glass is being drawn from one compartment, a portion of the molten glass within another compartment is adapted to be passing through its final refining and settling stage so that it will be ready to be drawn therefrom after the glass has been removed from the preceding compartment. Thus, that portion of the completely refined and settled glass is being progressively removed from the several compartments.

Thus, the compartments are progressively filled at intervals with glass batch ingredients so that the molten glass within the various compartments is being progressively conditioned to the end that one of the said compartments can always be discharging completely refined molten glass into the cooling chamber and so that as the completely refined glass in one compartment is being removed, a portion of the glass in another compartment will be passing through its final refining stage. Consequently, it will be seen that the molten glass is prepared by what might be termed an intermittent process, while the glass article is continuously produced. It is to be understood that as the molten glass is treated to the proper temperature and given a sufficient length of time, it will refine and settle so that the resultant molten glass will be relatively free from seeds, blisters and other common glass defects.

While I have shown the interior of the tank 10 as being divided into four individual compartments, it is to be understood that any desired number may be used without departing from the spirit of the invention also, that these partitions may be arranged in various ways and that one or any number of working receptacles may be resorted to. In order to prevent over-heating of the partition walls 13, 14 and 15, thereby lengthening the life thereof, coolers 39 may be arranged therein. These coolers preferably consist of hollow metallic casings through which may be continuously circulated a cooling medium such as water or air.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In a continuous tank furnace, a main tank having a plurality of longitudinally extending partitions arranged therein for dividing the interior thereof into a plurality of longitudinally extending individual compartments, each adapted to contain molten glass, a connecting chamber arranged at one end of the main tank and in communication with all of said compartments, said connecting chamber having forwardly converging side walls terminating in a neck positioned substantially intermediate the sides of the main tank, a cooling chamber associated with the neck and communicating with the connecting chamber, a working receptacle associated with the cooling chamber, a pair of forwardly converging guide walls positioned within the connecting chamber and spaced from the outer side walls thereof to direct the molten glass from the several compartments into the cooling chamber, and means for regulating the flow of glass from each of said individual compartments into the connecting chamber.

2. In a continuous tank furnace, a main tank having a plurality of longitudinally extending partitions arranged therein for dividing the interior thereof into a plurality of longitudinally extending individual compartments, each adapted to contain molten glass, a connecting chamber arranged at one end of the main tank and in communication with all of said compartments, said connecting chamber having forwardly converging side walls terminating in a neck positioned substantially intermediate the sides of the main tank, a cooling chamber associated with the neck and communicating with the connecting chamber, a working receptacle associated with the cooling chamber, a pair of forwardly converging guide walls positioned within the connecting chamber and spaced from the outer side walls thereof to direct the molten glass from the several compartments into the cooling chamber, means for regulating the flow of glass from each of said individual compartments into the connecting chamber, means common to all of said compartments for heating the same, and separate means for heating the glass within the connecting chamber.

Signed at Toledo, in the county of Lucas and State of Ohio, this 6th day of June, 1927.

FRANK FRASER.